United States Patent
Inazumi

(10) Patent No.: US 8,315,455 B2
(45) Date of Patent: Nov. 20, 2012

(54) ROBOT SYSTEM, ROBOT CONTROL DEVICE AND METHOD FOR CONTROLLING ROBOT

(75) Inventor: Mitsuhiro Inazumi, Shiojiri (JP)

(73) Assignee: Seiko Epson Corporation (JP)

(*) Notice: Subject to any disclaimer, the term of this patent is extended or adjusted under 35 U.S.C. 154(b) by 468 days.

(21) Appl. No.: 12/610,523

(22) Filed: Nov. 2, 2009

(65) Prior Publication Data

US 2010/0119146 A1   May 13, 2010

(30) Foreign Application Priority Data

Nov. 7, 2008   (JP) ................ 2008-286224

(51) Int. Cl.
G06K 9/00   (2006.01)
G06K 9/40   (2006.01)
(52) U.S. Cl. ......... 382/153; 382/103; 382/141; 382/255
(58) Field of Classification Search .................. None
See application file for complete search history.

(56) References Cited

U.S. PATENT DOCUMENTS

| | | | | |
|---|---|---|---|---|
| 6,317,953 | B1* | 11/2001 | Pryor | 29/407.04 |
| 2004/0170315 | A1* | 9/2004 | Kosaka et al. | 382/154 |
| 2006/0125938 | A1* | 6/2006 | Ben-Ezra et al. | 348/241 |
| 2007/0242142 | A1 | 10/2007 | Okazaki | |
| 2007/0263197 | A1* | 11/2007 | Luttikhuis et al. | 355/55 |
| 2008/0002900 | A1 | 1/2008 | Miki et al. | |
| 2008/0013850 | A1 | 1/2008 | Sakurai et al. | |

FOREIGN PATENT DOCUMENTS

| | | |
|---|---|---|
| JP | 2004-205802 | 7/2004 |
| JP | 2006-050494 | 2/2006 |
| JP | 2007-306548 | 11/2007 |
| JP | 2008-011424 | 1/2008 |
| JP | 2008-042874 | 2/2008 |
| JP | 2008-058546 | 3/2008 |
| JP | 2008-118644 | 5/2008 |

\* cited by examiner

*Primary Examiner* — Jason M Repko
*Assistant Examiner* — David F Dunphy
(74) *Attorney, Agent, or Firm* — Harness, Dickey & Pierce, P.L.C.

(57) ABSTRACT

A robot system includes a robot having a movable section, an image capture unit provided on the movable section, an output unit that allows the image capture unit to capture a target object and a reference mark and outputs a captured image in which the reference mark is imaged as a locus image, an extraction unit that extracts the locus image from the captured image, an image acquisition unit that performs image transformation on the basis of the extracted locus image by using the point spread function so as to acquire an image after the transformation from the captured image, a computation unit that computes a position of the target object on the basis of the acquired image, and a control unit that controls the robot so as to move the movable section toward the target object in accordance with the computed position.

15 Claims, 6 Drawing Sheets

ROBOT SYSTEM, ROBOT CONTROL DEVICE AND METHOD FOR CONTROLLING ROBOT

BACKGROUND

1. Technical Field

The present invention relates to a robot system, a robot control device and a method for controlling a robot.

2. Related Art

Multi-axis control robots for industrial use have been used in factories or manufacturing sites for automation or labor-saving. Such a robot for industrial use has a digital camera functioning as eyes of a human. The robot can autonomously move to a position where it can grip a target object by performing image-processing of images captured during movement and can autonomously pass over an obstacle during the movement. In recent years, particularly, it has been necessary to enhance accuracy in positioning by means of a high resolution digital camera and to perform correction of blurring in a captured image so as to deal with a high speed operation by the robot for industrial use. In a blur correction method as described above, information about movement of a moving object is detected by means of an acceleration sensor provided on a movable section of a robot for industrial use, a point spread function (hereinafter, referred to as PSF) indicative of a characteristic of blurring due to the movement is obtained on the basis of the detected information, and the correction of blurring is performed on the basis of the PSF. JP-A-2008-118644 and JP-A-2008-11424 are examples of the related arts.

However, since the acceleration sensor is provided on the movable section of the robot for industrial use, fluctuation in temperature or variation in acceleration may be increased depending on a working environment or work so that reliability or accuracy of the information output from the acceleration sensor may be degraded. In addition, in order to obtain the PSF with high accuracy, an image capturing timing of the digital camera and an output signal from the acceleration sensor have to be synchronized with each other so that much cost or labor is required.

SUMMARY

The invention intends to solve at least part of the above problem, and can be realized by the following aspects.

A robot system according to a first aspect of the invention includes a robot having a movable section, an image capture unit provided on the movable section, an output unit that allows the image capture unit to capture a target object and a reference mark and outputs a captured image in which the reference mark is imaged as a locus image, an extraction unit that extracts the locus image from the captured image, an image acquisition unit that performs image transformation on the basis of the extracted locus image by using the point spread function so as to acquire an image after the transformation from the captured image, a computation unit that computes a position of the target object on the basis of the acquired image, and a control unit that controls the robot so as to move the movable section toward the target object in accordance with the computed position.

With the above configuration, the locus image of the moved reference mark is extracted from the captured blurred image obtained by capturing the target object together with the reference mark during movement of the movable section. While making the extracted locus image to be a point spread function, an image whose blurring is reduced, is restored from the captured blurred image by the image transformation by using the point spread function. A position of the target object as a moving destination of the movable section is computed on the basis of with the restored image so that the robot is controlled so as to move the movable section toward the target object in accordance with the computed position. As a result, since the locus image of the reference mark imaged in the captured image is made to be the point spread function (PSF), it is possible to obviate the need of a device for acquiring information about the movement and to facilitate the acquisition without degrading the reliability and the accuracy.

In the robot system according to the first aspect of the invention, a periphery of the reference mark is preferably a monochrome region having a difference in brightness between the monochrome region and the reference mark so as to enable the reference mark to be identified as the reference mark.

With the above configuration, the extraction unit can extract the reference mark by readily identifying the reference mark.

In the robot system according to the first aspect of the invention, the size of the monochrome region is preferably greater than a size of a blurred region produced by movement of the movable section in the captured image.

With the above configuration, even when any other article image is imaged adjacent to the reference mark in the captured blurred image, the extraction unit can extract the reference mark by readily identifying the reference mark.

In the robot system according to the first aspect of the invention, the robot system further preferably includes a visual recognition unit that allow a user to visually recognize the reference mark included in the restored image.

With the above configuration, a user can recognize whether or not the image is adequately restored by visually recognizing the reference mark included in the restored image.

The robot system according to the first aspect of the invention, preferably includes two or more reference marks whose respective positions are already known.

With the above configuration, detection can be performed even when the movable section moves straight or rotationally moves.

A robot control device according to a second aspect of the invention includes a robot having a movable section, an image capture unit provided on the movable section, an input unit that receives a captured image including images of a target object and a reference mark, the reference mark being imaged as a locus image, an extraction unit that extracts the locus image from the input captured image, an image acquisition unit that performs image transformation on the basis of the extracted locus image by using the point spread function so as to acquire an image after the transformation from the captured image, a computation unit that computes a position of the target object on the basis of the acquired image, and a control unit that controls the robot so as to move the movable section toward the target object in accordance with the computed position.

With the above configuration, the locus image of the moved reference mark is extracted from the captured blurred image obtained by capturing the target object together with the reference mark during movement of the movable section. While making the extracted locus image to be a point spread function, an image whose blurring is reduced, is restored from the captured blurred image by the image transformation by using the point spread function. A position of the target object as a moving destination of the movable section is computed on the basis of the restored image so that the robot is controlled so as to move the movable section toward the target object in accordance with the computed position. As a result, since the locus image of the reference mark imaged in the captured image is made to be the point spread function, it is possible to obviate the need of a device for acquiring information about the movement and to facilitate the acquisition without degrading the reliability and the accuracy.

A robot control method according to a third aspect of the invention is used for a system including a robot, a target object that is a moving destination of a movable section provided on the robot, an image capture unit provided on the movable section, and a reference mark. The robot control method includes (a) inputting a captured an image including both images of the target object and the reference mark captured by the image capture unit during movement of the movable section, the reference mark being captured as a locus image, (b) extracting the locus image from the input captured image, (c) restoring an image obtained from the captured image by performing image on the basis of the extracted locus image transformation by using the point spread function, (d) computing a position of the target object on the basis of the restored image; and (e) controlling the robot so as to move the movable section toward the target object in accordance with the computed position.

With the above method, the locus image of the moved reference mark is extracted from the captured blurred image obtained by capturing the target object together with the reference mark during movement of the movable section. While making the extracted locus image to be the point spread function, an image whose blurring is reduced, is restored from the captured blurred image by the image transformation by using the point spread function. A position of the target object as a moving destination of the movable section is computed on the basis of the restored image so that the robot is controlled so as to move the movable section toward the target object in accordance with the computed position. As a result, since the locus image of the reference mark imaged in the captured image is made to be the point spread function, it is possible to obviate the need of a device for acquiring information about the movement and to facilitate the acquisition without degrading the reliability and the accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

The preferred embodiments according to the invention will be described with reference to the accompanying drawings. It should be noted that embodiments described below do not limit the spirit or scope of the invention defined by the appended claims and all the structures in the embodiments described below are not necessarily needed to form the solution of the invention.

Figure 1:
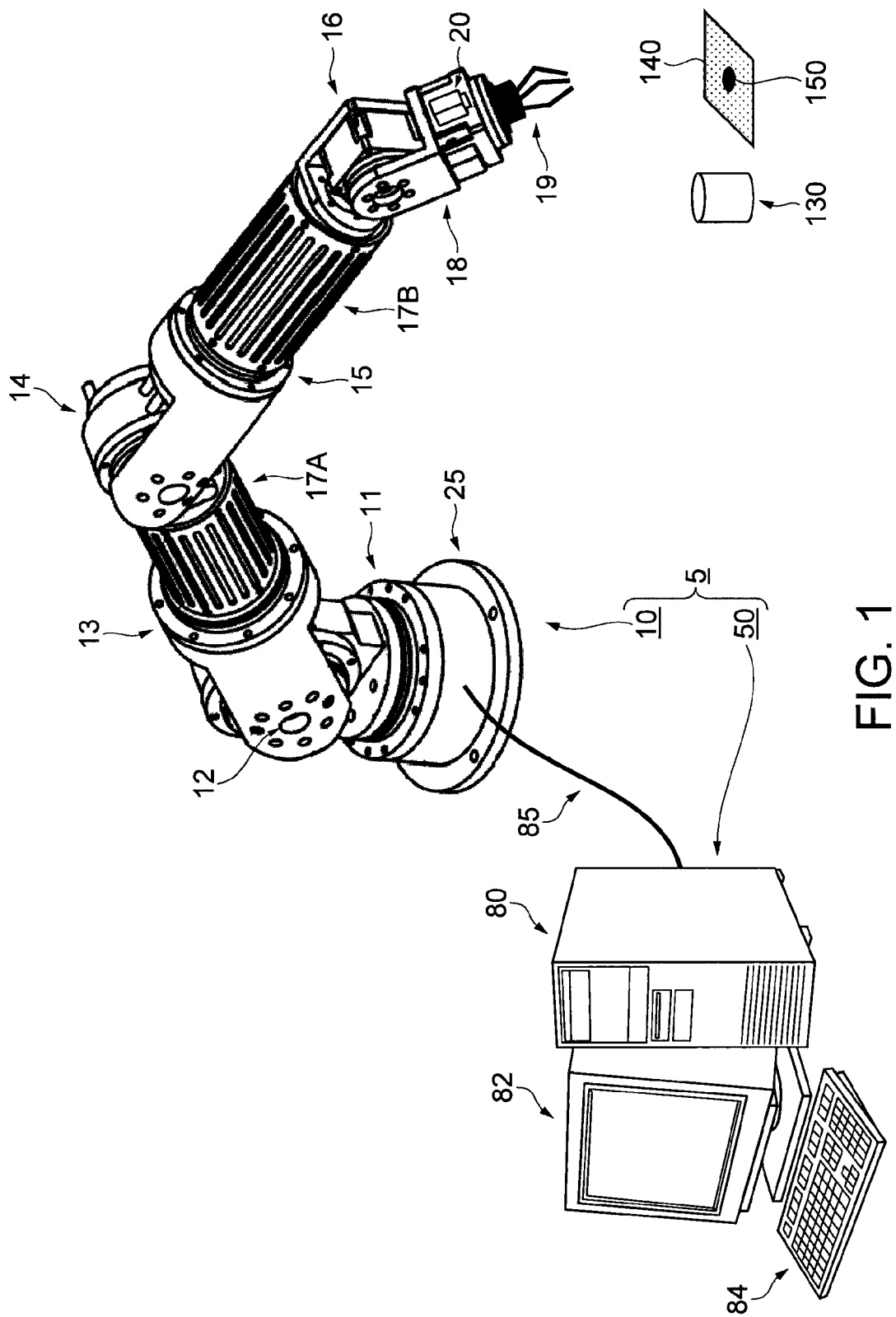
FIG. 1 is a schematic view showing a robot system according to a first embodiment of the invention.

First Embodiment:

FIG. 1 is a schematic view showing a robot system 5 according to a first embodiment of the invention. The robot system 5 is equipped with a robot 10 and a robot control device 50 that controls the robot 10. The robot 10 is a six-axis control multi-joint type robot that has movable sections including a robot base 25 as a base body to be placed on a placement face, a first shaft 11 that rotates around a vertical axis with respect to the placement face, a second shaft 12 that turns an arm 17A about a horizontal axis, a third shaft 13 that rotates in an axial direction of the arm 17A, a fourth shaft 14 that is fixed to the arm 17A and turns an arm 17B in a horizontal direction, a fifth shaft 15 that rotates in an axial direction of the arm 17B, and a sixth shaft 16 that is fixed to the arm 17B and turns a wrist 18 in the horizontal direction. A hand 19 for gripping a component and a digital camera 20 as an image capture unit for capturing in a gripping direction of the hand 19 by means of an imaging device such as a CCD (Charge Coupled Device, not shown) are attached to a tip portion of the wrist 18.

While the six-axis control multi-joint type robot is used as the robot 10 in the first embodiment, it is not limited thereto and a scalar type robot can be used. The use application of the robot 10 is not limited to the gripping of a component by the hand 19, but can be gripping of a tool for performing processing such as soldering or welding. In addition, the robot is not limited to one for industrial use, but for medical use or home use. The above driving shafts are configured so as to be rotated by driving of a plurality of actuators 30 (in FIG. 2) which are operated by a motor or an air compressing device (not shown). The plurality of actuators 30 are configured so as to be driven in accordance with control signals transmitted via a cable 85 from a robot control device 50. The digital camera 20 captures an image in a predetermined exposure time period, and the captured image is transmitted to the robot control device 50 via the cable 85.

A single plane marker 140 having a predetermined size and a monochrome color region is disposed at a portion in the vicinity of a workpiece 130 gripped by the hand 19 of the robot 10. A reference pattern 150 as a point-like mark is in-printed on the marker 140 at a roughly central part. The hand 19 and the marker 140 are disposed so as to be captured by the digital cameral 20 in an identical view field of the digital camera 20 and are formed to have colors and sizes so as to be identified with each other when they are captured by the digital camera 20. In the first embodiment, the marker 140 may have a gray color monochrome region and the reference pattern 150 may have a black color. However, the marker 140 and the reference pattern 150 are not limited thereto. There are no limitations on the color of the monochrome region as long as the monochrome region has a brightness level and a color saturation each being in an extent facilitating identification of the reference pattern 150.

The robot control device 50 is equipped with a computer 80, a display 82 and a keyboard 84. The computer 80 is constituted by hardware resources including a CPU (Central Processing Unit), a RAM (Random Access Memory), a ROM (Read Only Memory), an HDD (Hard Disk Drive), a sequencer, a robot controller and a drive unit (each being not shown). The computer 80 realizes functions of functional sections (described later) by a flexible association between the above hardware resources and software stored in the ROM or HDD.

Figure 2:
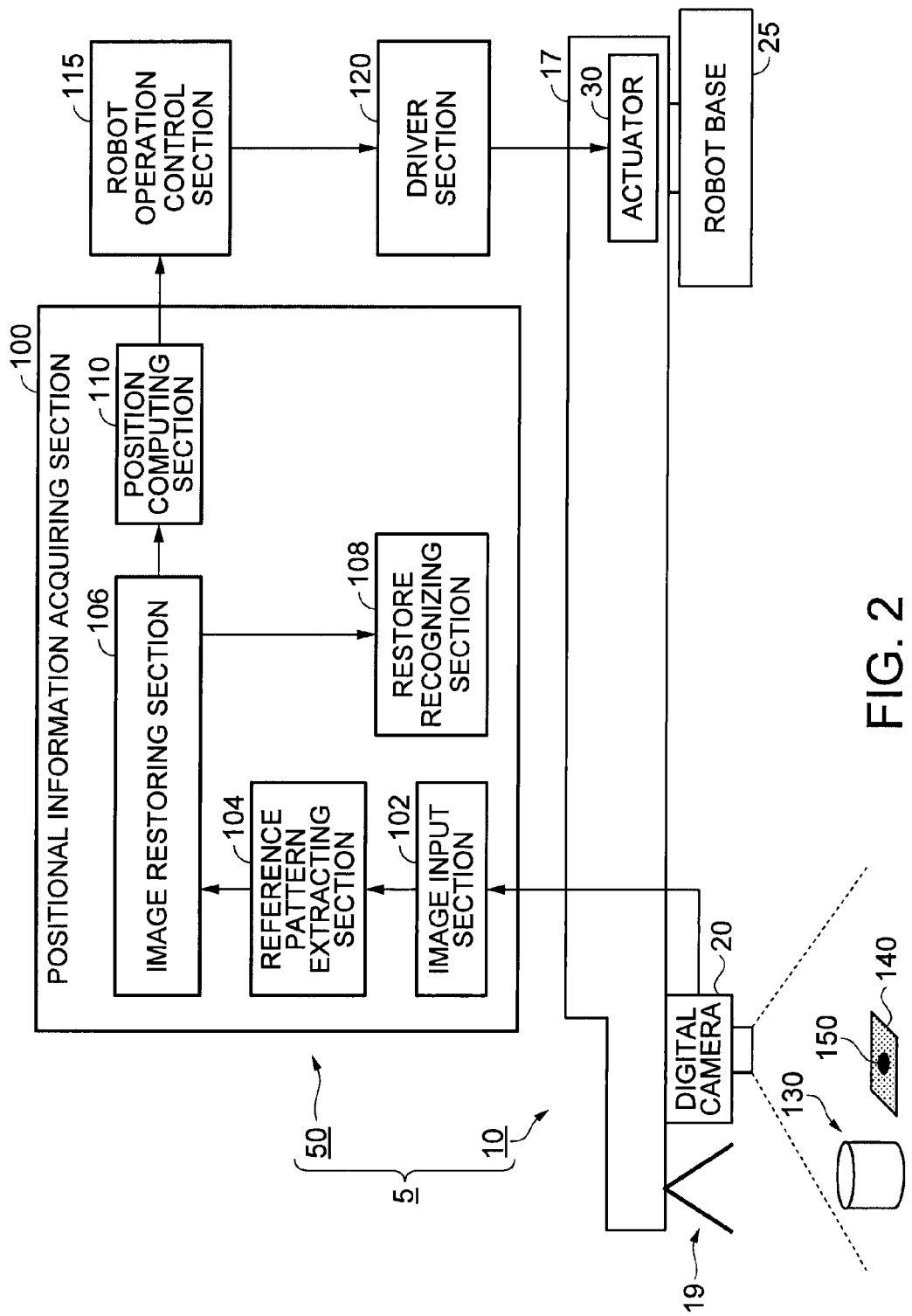
FIG. 2 is a plan view showing a functional structure of the robot system according to the first embodiment of the invention.
Figure 3A:
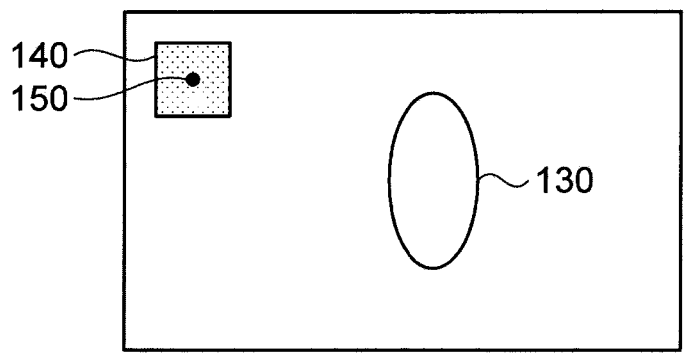
FIGS. 3A through 3E are explanatory views showing a captured marker and a captured reference pattern according to the embodiment of the invention.

FIG. 2 is a schematic block diagram showing a functional structure of the robot system 5. The robot control device 50 is equipped with a positional information acquiring section 100, a robot operation control section 115 and a driver section 120. The positional information acquiring section 100 has an image input section 102, a reference pattern extracting section 104, an image restoring section 106, a restore recognizing section 108 and a position computing section 110, and acquires positional information of a workpiece 130. The functional structure of the robot system 5 is described below with reference to FIG. 2 and FIGS. 3A and 3B. The image input section 102 is an input unit that receives an image signal output from the digital camera 20. The image signal input to the image input section 102 is a signal of an image of the workpiece 130 viewed from the upper portion as shown in FIG. 3A, and the image includes the reference pattern 150 and the marker 140 in the identical view field. The image is transmitted to the reference pattern extracting section 104. Since the digital camera 20 is attached to the hand 19 of the robot 10, when capturing of an image is performed by opening a shutter for a predetermined exposure time period during the movement of an arm 17, a blurred image due to the movement is output.

Figure 3B:
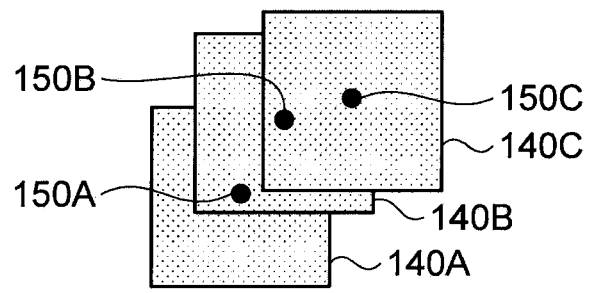
Figure 3C:
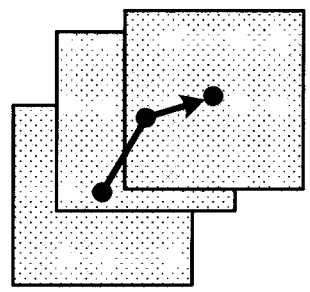
Figure 3D:
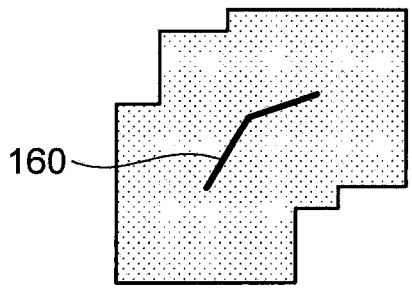

FIGS. 3B and 3C are schematic views showing movement of the reference pattern 150. Along with the movement of the arm 17, the marker 140 is moved toward a right upper direction as shown by images 140A, 140B and 140C of the marker 140 in FIG. 3B and is captured and the reference patterns 150 is moved toward a right upper direction as shown by images 150A, 150B and 150C of reference pattern 150 in FIGS. 3B and 3C. As a result, a signal of a blurred image including a locus image 160 indicative of a locus of the moved reference pattern 150 as shown in FIG. 3D is transmitted to the reference pattern extracting section 104. In this instance, the images 140A, 140B and 140C of the marker 140 have an identical background region.

The reference pattern extracting section 104 is an extraction unit that extracts the locus image 160 of the reference pattern 150 by analyzing signals of the input blurred images. Information about the extracted locus image 160 is transmitted to the image restoring section 106. In this instance, since the locus image 160 and the marker 140 have different brightness levels and color saturations, they can be identified with each other in accordance with the differences so that the locus image 160 can be readily extracted. In the above case, the marker 140 can be first extracted from the blurred images on the basis of a color component or a shape of the marker 140. Next, the locus image 160 included in the marker 140 can be extracted on the basis of a difference in the brightness level. In a case where a background article is imaged in a background region where the images 140A, 140B and 140C of the marker 140 captured during the exposure time period are not superposed in an image captured by the digital camera 20, the locus image 160 may not be possibly extracted.

Therefore, a size of the marker 140 is determined depending on the exposure time period of the digital camera 20 and a moving speed of the arm 17 so that an overlapped region of the marker 140 produced by the movement of the arm 17 in the blurred image includes the locus image 160. Namely, the size is determined to be larger than a maximum blurred amount generated by the movement. In addition, the extracted locus image 160 indicates information about the PSF for the spatial movement. In this instance, the brightness value of the locus image 160 varies in accordance with the moving speed of the arm 17. Namely, the more the moving speed decreases, the more the brightness values of points forming the locus image 160 increase, and vice versa. Consequently, in the first embodiment, a change of the brightness value of the line-like locus image 160 can be acquired within a range of assumed moving speeds.

Figure 3E:
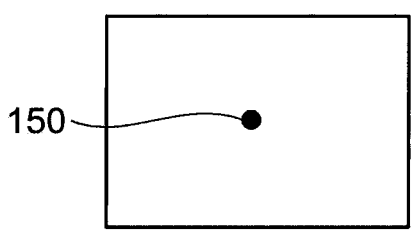

The image restoring section 106 as a restore unit performs image transformation (inverse conversion) of a blurred image by using the PSF indicated by the locus image 160 extracted by the reference pattern extracting section 104. By the above image transformation, the blurring is corrected so that an image having less blurring (a restored image) near an original image can be restored. Note that, the above method is described in, for example, JP-A-2006-279807. The restored image whose blurring is corrected is transmitted to the position computing section 110. As a result of the correction of the blurring, the locus image 160 involved in the image before correction is converted to a single reference pattern 150 having no blurring in the restored image as shown in FIG. 3E.

The restore recognizing section 108 as a visual recognition unit allows a user to visually recognize that the correction is adequately performed by displaying the converted reference pattern 150 on the display 82. Here, when the user recognizes that the reference pattern 150 is not adequately restored as a result of the visual recognition, the user can instruct the restoring of the image again to the positional information acquiring section 100. The position computing section 110 as a computation unit computes a position of the workpiece 130 in accordance with the restored image and transmits information about the computed position to the robot operation control section 115. The robot operation control section 115 and the driver section 120 constitute a control unit that controls an operation of a movable portion of the arm 17. The robot control section 115 computes a driving amount of each of the plurality of actuators 30 for moving the robot 10 in accordance with the received information about the position and transmits the driving information about the computed driving amount to the driver section 120. The driver section 120 generates a drive signal for each of the actuators 30 in accordance with the driving information received from the robot control section 115 and transmits the drive signals to the respective actuators 30. As a result, the arm 17 may move to a predetermined position or the hand 19 may grip the workpiece 130.

Figure 4:
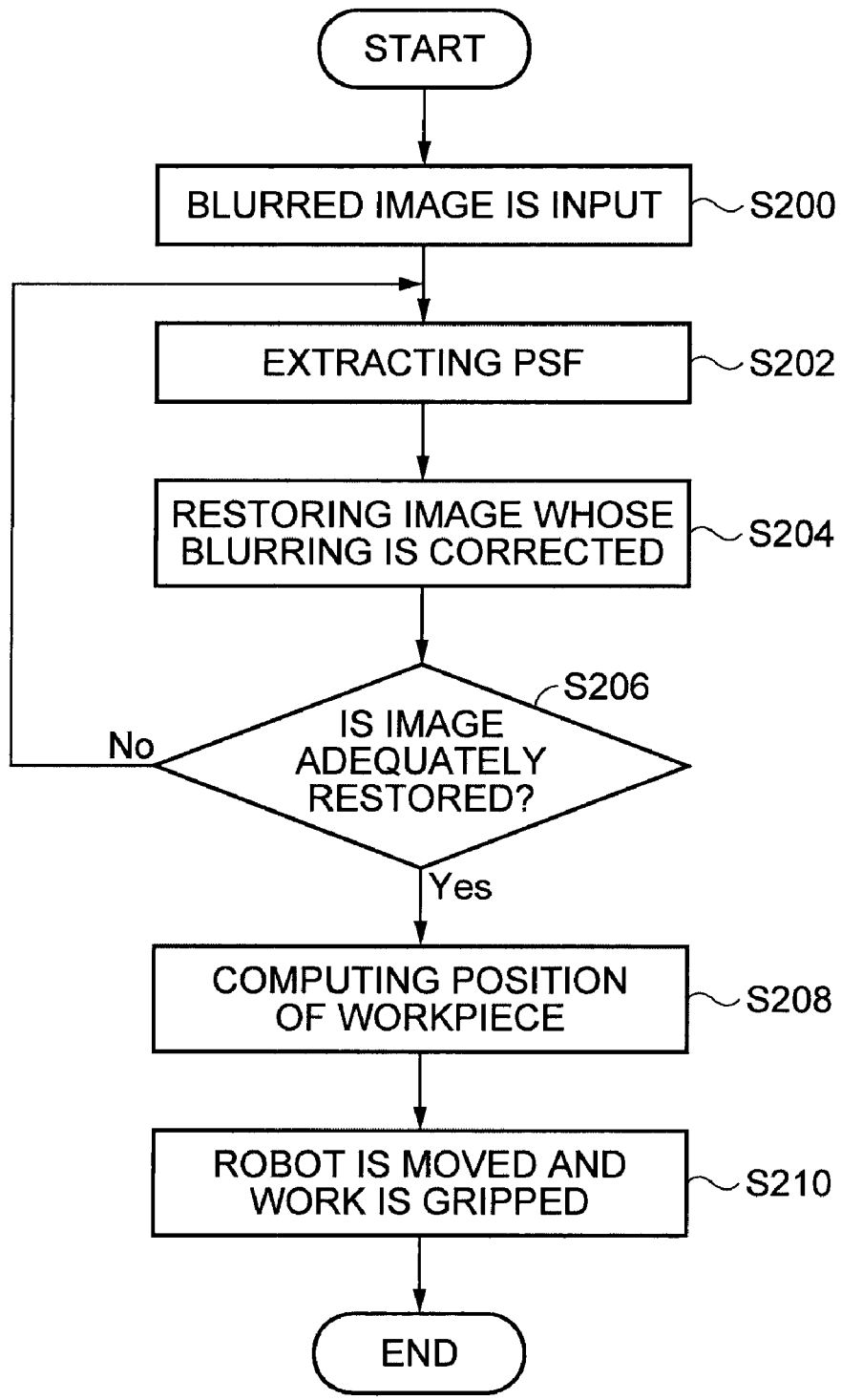
FIG. 4 is a flowchart showing a flow of processes of the robot system according to the first embodiment of the invention.

FIG. 4 is a flowchart showing a flow of processing in which the robot 10 grips the workpiece 130 in the robot system 5. In the processing, a blurred image whose blurring is due to movement of the robot 10 is first input (step S200). Next, the CPU of the computer 80 extracts a PSF as a reference pattern in the input image (step S202). Then, the CPU restores the image whose blurring is corrected in accordance with the extracted PSF (step S204). Next, it is determined whether or not the image is adequately restored (step S206).

When it is judged that the image is not adequately restored ("No" in step S206), the CPU returns to the process (the step S202) in which the PSF as the reference pattern is extracted from the input image and restores the image again (step S208). On the other hand, when it is judged that the image is adequately restored ("Yes" in step S206), the CPU computes the position of the workpiece on the basis of the restored image (step S208). Next, the CPU instructs the robot 10 to move to a position capable of gripping the workpiece 130 and to grip the workpiece 130 (step S210), and then finishes the series of processes.

With the above processes, in a case where the input image includes the blurring generated due to movement of the digital camera 20 attached to the arm 17 during the capturing of the image, the image is subjected to the inverse-conversion on the basis of the PSF indicated by the locus image 160 of the reference pattern 150 on the marker 140 so as to obtain the image whose burring is corrected. Further, the position of the workpiece 130 is computed on the basis of the converted image and the arm 17 is moved to the computed position. As a result, the robot control device 50 can accurately acquire the position of the workpiece 130 and the robot 10 can surely grip the workpiece 130.

Figure 5A:
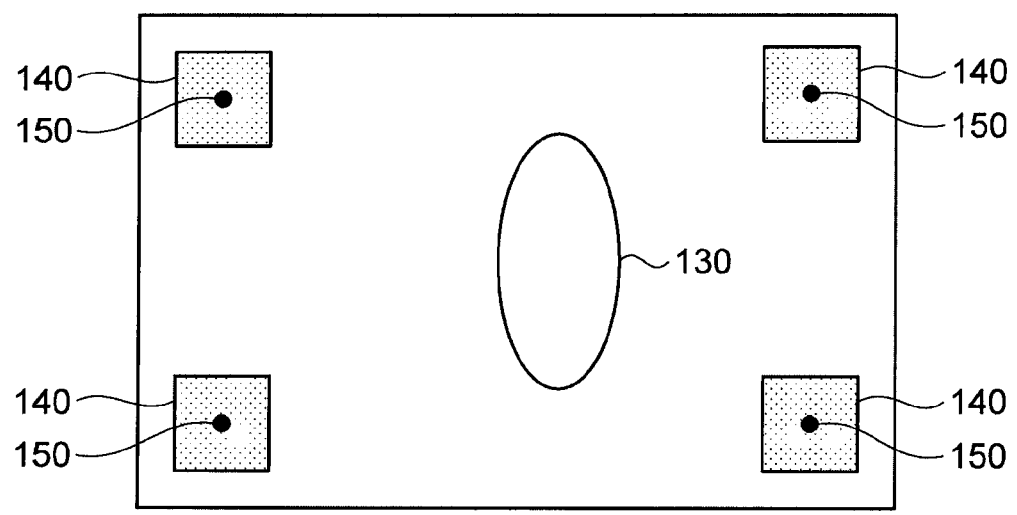
FIGS. 5A and 5B are explanatory views showing arrangement of a marker and a reference pattern according to a second embodiment of the invention.

Second Embodiment:

A second embodiment of the invention will be described with reference to FIGS. 5A and 5B. Note that, the sections, portions or members the same as in the above described first embodiment are denoted by the same numerals, and their descriptions are omitted. In the first embodiment, the workpiece 130 and one marker 140 are disposed in the view field of the digital camera 20. However, in the second embodiment, the workpiece 130 and four markers 140 whose positional relationships are already known are placed on an identical plane of the workpiece 130 at a peripheral portion of the workpiece 130 as shown in FIG. 5A. Note that, it is enough to put at least three markers 140 in the identical view field of the digital camera 20.

Figure 5B:
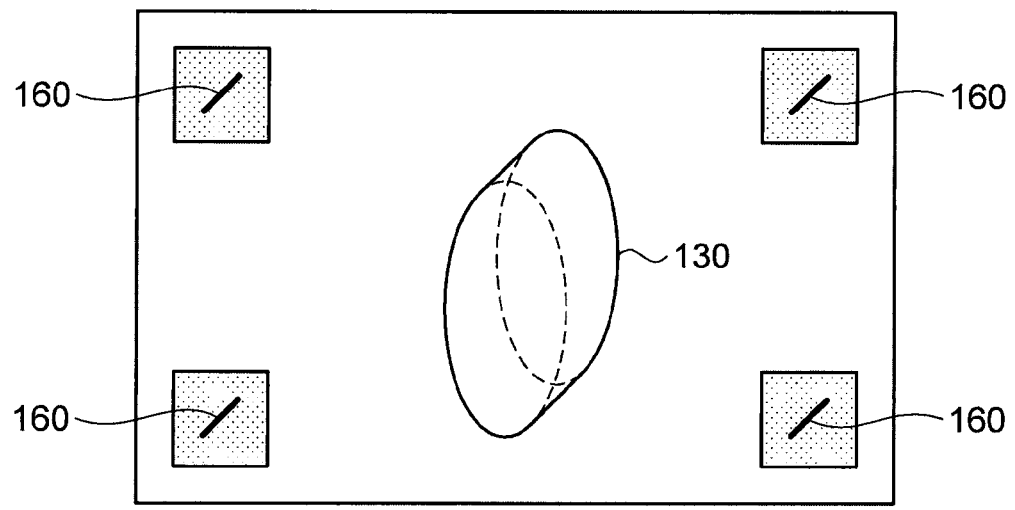

FIG. 5B is an explanatory view showing an image captured when the arm 17 moves straight. While the image of the marker 140 is actually blurred in the moving direction, the blurring of the marker 140 is not indicated because its blurring is not essential for explanation of this case. In the case of the above described straight movement, the blurring due to the movement can be corrected by processes similar to the first embodiment.

Figure 6A:
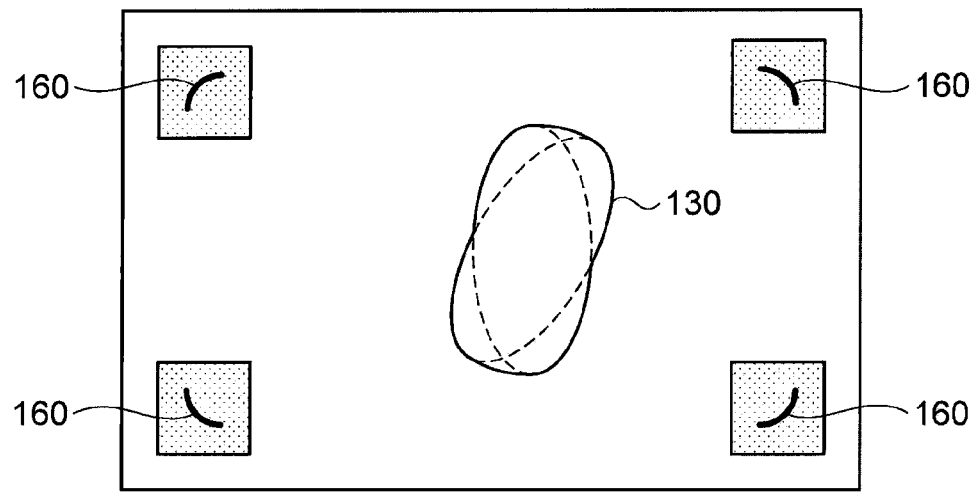
FIGS. 6A and 6B are explanatory views showing rotational movement of the marker and the reference pattern according to the second embodiment of the invention.
Figure 6B:
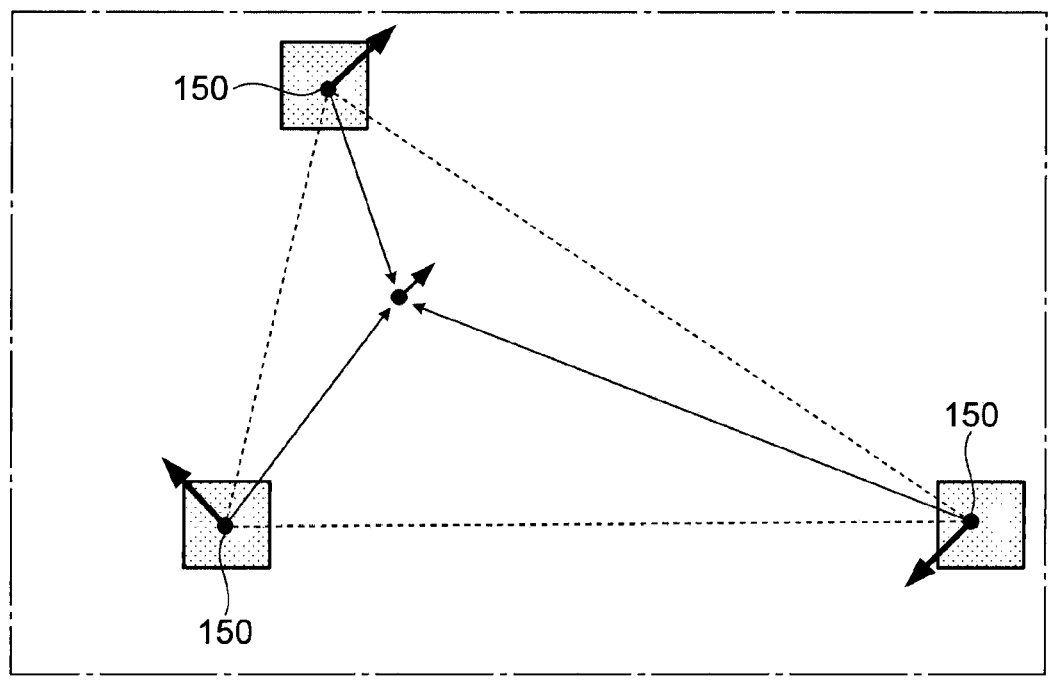

FIG. 6A is an explanatory view showing an image captured when the arm 17 rotationally moves around a position in the vicinity of the workpiece 130. In this case, the robot control device 50 can obtain a rotation center and a moving direction as a coefficient of an affine transformation in accordance with moving amounts of three or more markers 140 as shown in FIG. 6B. Note that, the affine transformation is a well known transformation method for expanding, contracting, rotating or parallel moving of an image. As a result of the affine transformation, even in a case where the arm 17 moves straight or rotationally moves or performs an operation with scaling, the robot control device 50 can adequately restore an image from a blurred image as long as the digital camera 20 moves without rotating around its axis. In addition, in a case where four or more markers 140 are input in an identical view field of the digital camera 20, a change with respect to projection transformation can be detected. In the second embodiment, it is possible to achieve an effect similar to that in the first embodiment.

While the embodiments of the invention are described with reference to the drawings, the specific structure is not limited thereto, and variations or modifications in designing can be made without departing from the scope and spirit of the invention. For example, the marker 140 can be made to have a black color, and the brightness value of the reference pattern 150 can be increased. The marker 140 is not limited to a plate shape, but can have a solid shape.

The entire disclosure of Japanese Patent Application No. 2008-286224 filed Nov. 7, 2008 is expressly incorporated by reference herein.

What is claimed is:

1. A robot system, comprising:
   a robot having a movable section, the movable section moving at a predetermined speed;
   a marker including a reference mark, the reference mark being located in the vicinity of a target object to which the movable section moves;
   an image capture device that includes a shutter, the image capture device being provided on the movable section, and capturing the reference mark as a blurred image while the movable section is in motion by opening the shutter for a predetermined exposure time period, the image capture device outputting the blurred image including a locus image of the reference mark;
   an extractor that extracts the locus image of the reference mark from the blurred image;
   an image restoration device that restores a non-blurred image of the reference mark based on a point spread function of the extracted locus image of the reference mark;
   a processor that computes a position of the target object on the basis of the restored non-blurred image; and
   a controller that controls the robot so as to move the movable section toward the target object in accordance with the computed position,
   wherein a size of the marker is determined in accordance with the predetermined exposure time period and the predetermined speed.

2. The robot system according to claim 1 wherein, a periphery of the reference mark in the marker is a monochrome region having a difference in brightness between the monochrome region and the reference mark so as to enable the reference mark to be identified as the reference mark.

3. The robot system according to claim 2 wherein, the monochrome region has a size greater than a size of a blurred area of the blurred image.

4. The robot system according to claim 1, further comprising:
   a display that displays the reference mark included in the non-blurred image to be visually recognized.

5. The robot system according to claim 1 comprising:
   two or more of the reference marks that are located in the vicinity of the target object at pre-selected respective positions.

6. A robot control device, comprising:
   a robot having a movable section, the movable section moving at a predetermined speed;
   a marker including a reference mark, the reference mark being located in the vicinity of a target object to which the movable section moves;
   an image capture device that is provided on the movable section, the image capture device capturing the reference mark as a blurred image while the movable section is in motion during a predetermined exposure time period and inputting the blurred image including a locus image of the reference mark;
   an extractor that extracts the locus image of the reference mark from the blurred image;
   an image restoration device that restores a non-blurred image of the reference mark based on a point spread function of the extracted locus image of the reference mark;
   a processor that computes a position of the target object on the basis of the restored non-blurred image; and
   a controller that controls the robot so as to move the movable section toward the target object in accordance with the computed position,
   wherein a size of the marker is determined in accordance with the predetermined exposure time period and the predetermined speed.

7. A robot control method for a system including a robot, a target object that is a moving destination of a movable section, which moves at a predetermined speed, provided on the robot, an image capture device provided on the movable section, and a marker including a reference mark, the robot control method comprising:
  (a) capturing a blurred image including the reference mark captured by the image capture device during movement of the movable section for a predetermined exposure time period, the reference mark being imaged as a locus image;
  (b) extracting the locus image of the reference mark from the blurred image;
  (c) restoring a non-blurred image of the reference mark based on a point spread function of the extracted locus image of the reference mark;
  (d) computing a position of the target object on the basis of the restored non-blurred image; and
  (e) controlling the robot so as to move the movable section toward the target object in accordance with the computed position,
  wherein a size of the marker is determined in accordance with the predetermined exposure time period and the predetermined speed.

8. The robot control device according to claim 6 wherein, a periphery of the reference mark in the marker is a monochrome region having a difference in brightness between the monochrome region and the reference mark.

9. The robot control device according to claim 8 wherein, the monochrome region has a size greater than a size of a blurred area of the blurred image.

10. The robot control device according to claim 6, further comprising:
  a display that displays the reference mark included in the non-blurred image.

11. The robot control device according to claim 6, further comprising:
  two or more of the reference marks that are located in the vicinity of the target object.

12. The robot control method according to claim 7, wherein a periphery of the reference mark in the marker is a monochrome region having a difference in brightness between the monochrome region and the reference mark.

13. The robot control method according to claim 12, wherein,
  the monochrome region has a size greater than a size of a blurred area of the blurred image.

14. The robot control method according to claim 7, further comprising:
  (f) displaying the reference mark included in the non-blurred image.

15. The robot control method according to claim 7, further comprising:
  two or more of the reference marks that are located in the vicinity of the target object.

* * * * *